United States Patent
Sahabhaumik et al.

(10) Patent No.: US 11,024,310 B2
(45) Date of Patent: Jun. 1, 2021

(54) VOICE CONTROL FOR MEDIA CONTENT SEARCH AND SELECTION

(71) Applicant: Sling Media Pvt. Ltd., Bangalore (IN)

(72) Inventors: Soham Sahabhaumik, Karnataka (IN); Karthik Mahabaleshwar Hegde, Karnataka (IN); Amrit Mishra, Karnataka (IN); Yatish Jayant Naik Raikar, Karnataka (IN)

(73) Assignee: Sling Media Pvt. Ltd., Bangalore (IN)

( * ) Notice: Subject to any disclaimer, the term of this patent is extended or adjusted under 35 U.S.C. 154(b) by 151 days.

(21) Appl. No.: 16/382,863

(22) Filed: Apr. 12, 2019

(65) Prior Publication Data

US 2020/0211543 A1     Jul. 2, 2020

(30) Foreign Application Priority Data

Dec. 31, 2018  (IN) .............................. 201841049914

(51) Int. Cl.
*G10L 15/22*   (2006.01)
*G10L 15/18*   (2013.01)

(52) U.S. Cl.
CPC .......... *G10L 15/22* (2013.01); *G10L 15/1822* (2013.01); *G10L 2015/223* (2013.01)

(58) Field of Classification Search
CPC ................................. G10L 15/22; G06F 16/48
USPC ....................................................... 704/235
See application file for complete search history.

(56) References Cited

U.S. PATENT DOCUMENTS

| | | | |
|---|---|---|---|
| 9,852,136 B2 * | 12/2017 | Venkataraman | ........ G06F 16/48 |
| 10,496,705 B1 * | 12/2019 | Irani | ........... G06F 9/44 |
| 10,504,518 B1 * | 12/2019 | Irani | ........... G06F 9/44 |
| 10,540,387 B2 * | 1/2020 | Venkataraman | ........ G06F 16/48 |
| 10,679,608 B2 * | 6/2020 | Mixter | ..................... G10L 15/22 |
| 10,783,883 B2 * | 9/2020 | Mixter | ..................... G10L 15/22 |
| 2007/0150273 A1 | 6/2007 | Yamamoto et al. | |
| 2008/0167872 A1 | 7/2008 | Okimoto et al. | |
| 2009/0083029 A1 | 3/2009 | Doi et al. | |

OTHER PUBLICATIONS

International Search Report and Written Opinion for PCT/IN2019/050941 dated Feb. 13, 2020, all pages.

\* cited by examiner

*Primary Examiner* — Susan I McFadden

(74) *Attorney, Agent, or Firm* — Kilpatrick Townsend & Stockton LLP

(57) ABSTRACT

Various techniques are described herein for supporting voice command control of electronic programming guides (EPGs) and other media content selection systems. The voice input hardware and software components of a remote control device, television receiver, smartphone, virtual assistant, and/or other media device may receive voice commands from a user corresponding to a selection of a media content. In response to the received voice input, the media device may perform a speech-to-text conversion of the voice input, and then perform an analysis of the command text to determine one or more content selections of the user. The analysis may include identifying within the command text one or more television channel names, program names, or other media content names, as well as identifying other instructions, preferences, or other meaningful insights from the command text.

20 Claims, 6 Drawing Sheets

VOICE CONTROL FOR MEDIA CONTENT SEARCH AND SELECTION

CROSS-REFERENCE TO RELATED APPLICATIONS

The present application claims priority to India Provisional Application No. 201841049914, filed Dec. 31, 2018, entitled "VOICE CONTROL FOR MEDIA CONTENT SEARCH AND SELECTION." The entire contents of India Provisional Application No. 201841049914 is incorporated herein by reference for all purposes.

BACKGROUND

The amount of audio and visual content, such as television programs, movies, documentaries, podcasts, and audio books, has expanded greatly in recent years. With such a large amount of content available, it is easier than ever for users to consume their preferred media content from their homes, vehicles, and any number of personal electronic devices. However, the increasing number of media content options available makes it still more difficult for consumers to search for, review, and select particular media content for consumption. Additionally, the various different types of electronic devices, including television receivers with electronic programming guides (EPGs), smartphones, virtual assistant devices, etc., each may use different user input controls, further increasing the complexity for consumers to search and select particular media content via their various electronic devices.

SUMMARY

Various embodiments described herein relate to hardware- and software-based techniques (e.g., methods, systems, devices, computer-readable media storing computer-executable instructions used to perform computing functions, etc.) for supporting voice command control of electronic programming guides (EPGs) and other media content selection systems. An increasing number of media devices and other types of electronic devices may support voice control, as usage of speech commands to control devices is becoming more and more ubiquitous. Accordingly, in some embodiments, the voice input hardware and software components of a remote control device, television receiver, smartphone, virtual assistant, and/or other media device may receive voice commands from a user corresponding to a selection of a television channel, television program or movie, song or music channel, audiobook, podcast, or other types of media content. In response to the received voice input, the media device may perform a speech-to-text conversion of the voice input, and then perform an analysis of the command text to determine one or more content selections of the user. The analysis may include identifying within the command text one or more television channel names, television program names, movie names, song names, music channel names, DVR recording names, podcast names, and/or audiobook names, as well as identifying other instructions, preferences, or other meaningful insights from the command text. Finally, the user commands determined based on the text analysis may be executed by the media device. Such commands may including the selection of particular media content (e.g., channels, programs, etc.) along with instructions for executing the content (e.g., recording instructions and/or playback instructions) and/or specified media output devices on which the content is to be executed.

In certain embodiments herein, the speech-to-text conversion and/or the subsequent analysis of the command text performed by the media device may include identifying and resolving one or more command ambiguities or other problems that are specific to the selection of programming and/or media content. For example, a user may use a voice command with a common name or common acronym for a television channel or program, which may be different from the actual name/title of the television channel or program. Additionally, in some cases, titles of content (e.g., channel names, television program names, etc.) may include numbers and/or special characters (e.g., !, @, #, $, &, *, :, ', etc.) which cannot be spoken by a user, and thus may cause a basic matching algorithm to fail. Further, in some examples, the speech-to-text conversion may be partial or may contain errors, so that the command text corresponding to the media content selection (e.g., channel name, program name, movie name, etc.) does not exactly match the actual content name. In still other examples, the speech-to-text conversion may result in a homonym or same/similar sounding word to the media content selection, which also may cause the matching algorithm to fail. Thus, certain techniques of the speech-to-text conversion and/or the analysis of the command text performed by the media device may include identifying and resolving such ambiguities and problems that are specific to the selection of channels, programs, and other media content. Such techniques, described below in more detail, may include combinations of mapping tables, stripping of special characters, and/or executing double metaphone phonetic algorithms on the user voice commands and/or the media content names.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The amount of audio and visual content, such as television programs, movies, documentaries, podcasts, and audio books, has expanded greatly in recent years. With such a large amount of content available, it is easier than ever for users to consume their preferred media content from their homes, vehicles, and any number of personal electronic devices. However, the increasing number of media content options available makes it still more difficult for consumers to search for, review, and select particular media content for consumption. Additionally, the various different types of electronic devices, including television receivers with electronic programming guides (EPGs), smartphones, virtual assistant devices, etc., each may use different user input controls, further increasing the complexity for consumers to search and select particular media content via their various electronic devices.

Embodiments detailed herein are directed to allowing content viewers to submit proposed metadata tags via captured audio clips, thus allowing the content viewers to submit proposed metadata tags with minimal effort. The proposed metadata tags are weighted, stored, and ranked using popularity. The most popular viewer-submitted metadata tags may be visually presented as part of an electronic programming guide (EPG) entry for the content. Less popular viewer-submitted tags may be used to produce search results, but may not be visually presented on the accompanying EPG entry. The less popular (the fewer number of times submitted by viewers) a given metadata tag is, the further down in search results the linked content may be presented. Still less popular viewer-submitted tags may be stored, but not used for search results. Such an arrangement may prevent inadvertent or incorrect metadata tags from significantly affecting search results.

Figure 1:
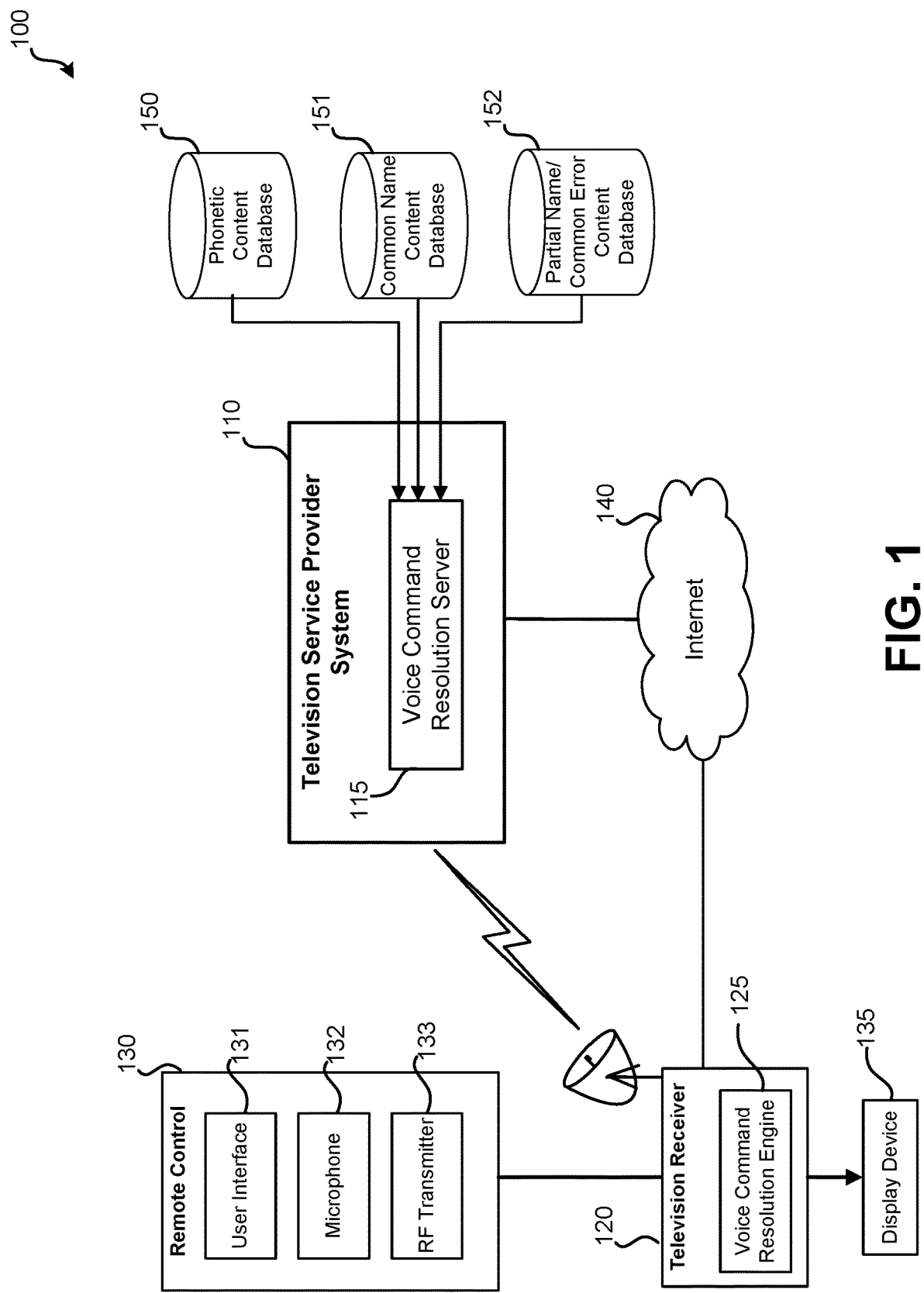
FIG. 1 illustrates an embodiment of a voice command resolution system.

Further detail is provided in relation to the figures. FIG. 1 illustrates an embodiment of a voice command resolution system 100. As shown in this example, system 100 may include: a television service provider system 110, a television receiver 120, remote control 130, display device 135, one or more communication networks (e.g., satellite network and/or IP-computer network 140), and content command resolution databases 150-152. Various television receivers, possibly numbering in the thousands, may communicate with the television service provider system 110 via satellite networks, the Internet 140, and/or other networked arrangement (e.g., cable, phone, or wireless communication networks). For simplicity, only a single television receiver 120, remote control, and display device are discussed in this example. Additionally, although the client device depicted in this example is a television receiver 120 which receives voice commands via remote control 130 and outputs media content to display device 135, it should be understood that the techniques described herein are applicable to other input/output devices as well. For example, in some embodiments, smartphones or other mobile devices may receive the voice command input and/or output the requested media content. Additionally, virtual assistant devices installed in user's homes or vehicles also may be configured to receive, convert, and/or analyze the voice commands for media content, after which the requested content may be presented to the user via the television receiver 120 or other computing device (e.g., laptop or tablet computer, smartphone, etc.). Further detail regarding the hardware arrangement of television receiver 120 (and/or tablet, smartphone, virtual assistant device, etc.) is provided in relation to FIG. 6.

In this example, television receiver 120 may use remote control 130 as a user interface that allows a content viewer to interact with television receiver 120 and, in turn, with the television service provider server 110. Remote control 130 may include user interface 131, microphone 132, and RF transmitter 133 (and/or a Bluetooth transmitter). User interface 131 may include buttons that have defined functions or assignable functions, various rotatable wheels, joysticks, accelerometers, gyroscopes, motion sensors, and/or touchpads. Microphone 132 may be activated in response to a command received from television receiver 120 or user input provided to user interface 131. Audio captured by microphone 132 may be transmitted via RF transmitter 133 to television receiver 120. Television receiver 120 may relay audio received from remote control 130 to television service provider server 110. In some embodiments, a form of wireless transmitter other than a radio frequency-based wireless transmitter may be used.

As discussed in more detail below, voice commands requesting particular media content (e.g., television channels, programs, movies, recorded content, etc.) may be received via the remote control 130, transmitted to the television receiver 120, and then processed and analyzed using the voice command resolution engine 125 within the television receiver 120. After determining the particular requested media content and the requested action (e.g., play the media, record the media, delete the media, etc.), the television receiver 120 may execute the requested action, which may include content playback or EPG output to the display device 135. Also discussed in more detail below, the voice command resolution engine 125 executing on the television receiver 120 may communicate with a voice command resolution server 115 within the television service provider system 110, for example, to receive content-related data from databases 150-152, upload request data, etc.

Although this example shows that voice commands may be received via a remote control 130, transmitted to the television receiver 120 that communicates over the network 140 with the server 110, other hardware/network configurations may be implemented to support other embodiments. For example, in some cases, user voice commands may be received directly by the television receiver 120. Additionally, user voice commands may be received via other types of electronic devices, such as smartphones, tablets, virtual assistant devices, wearable electronic devices, etc. In these embodiments, the electronic device receiving the voice command may transmit the command to the television receiver, to a separate modem/router device at the user's location, or directly to the server 110 via cellular and/or other communication networks. Further, although this example shows that the user's voice command for media content is received, analyzed, and processed at the voice command resolution engine 125 within the television receiver 120, in other examples, some or all of the hardware or software components of the voice command resolution engine 125 and/or any of the functionality of the engine 125 may be implemented elsewhere within the computing architecture, including within the remote control 130, within the television service provider server 110, or within a separate device such as the network router/modem, the user's smartphone, tablet device, etc.

Content command resolution databases 150-152 may be a centralized repository of data used to resolve user voice commands into actual media content items (e.g., television channels, programs, movies, recorded resources, music channels, songs, albums, audiobooks, podcasts, etc.). In this example, database 150 is a phonetic content database which includes phonetic encodings of a list of media content resources that potentially may be requested by the user, including television channels, television programs, movies, etc. In some embodiments, the double metaphone encoding algorithm may be used to encode all possible television channels, program titles, etc., and the encoded outputs (e.g., including both a primary and a secondary code) may be sorted and stored in database 150. Alternatively, other algorithms to perform either precise or approximated phonetic encodings of media content names (e.g., Metaphone 3, soundex, caverphone, Daitch-Mokotoff, etc.) may be used. Database 151 is a common name content database, which may include mappings between the actual names of certain television channels, programs, movies, etc., and one or more different "common names" that may be spoken by a user to refer to the media content. For instance, the television service provider may determine that users commonly refer to the "Fox Sports 1" channel as "FS1." In this case, an entry may be added to the common name content database 151 mapping voice commands for "FS1" to "Fox Sports 1" and so on. Similarly, database 152 (which may be combined with database 151) is a partial name/common error content database, which may include additional mappings between the actual names of certain media content and either corresponding partial names or common errors in the actual names of the media content. For example, the television service provider may determine that there is a likelihood of users referring to the program "Marvel's The Avengers" as "Marvel The Avengers" and "Marvels the Avengers." In this case, entries may be added to the database 152 mapping voice commands for "Marvel the Avengers" and "Marvels the Avengers" to the actual program name of "Marvel's the Avengers." Additional examples of mappings between actual media content names, and associated (i) common names, (ii) partial names, and/or (iii) common error names are described below in reference to FIGS. 3 and 4. Each of the content command resolution databases 150-152 may be stored and maintained separately (e.g., by separate television service providers and/or other third-party providers), or may be integrated within the television service provider system 110.

The television service provider system 110 may include various components that are implemented using software, firmware, and/or hardware. In addition to receiving, storing, and providing television content to its network of television receivers 120, the television service provider system 110 may include a voice command resolution server 115 configured to generate and store any or all of the data within the content command resolution databases 150-152. For example, the voice command resolution server 115 may receive and analyze listings of the media content it is configured to provide (e.g., television channels, programs, movies, music titles, etc.) to programmatically generate the common-to-actual, partial-to-actual, erroneous-to-actual media content name mappings stored in databases 150-152. The voice command resolution server 115 may also generate and store listings of phonetic encodings corresponding to particular media content items. As discussed in more detail below, the voice command resolution server 115 may be configured to automatically update the mappings and data stored in databases 150-152 and to transmit this data to its subscriber network of television receivers 120.

Figure 2:
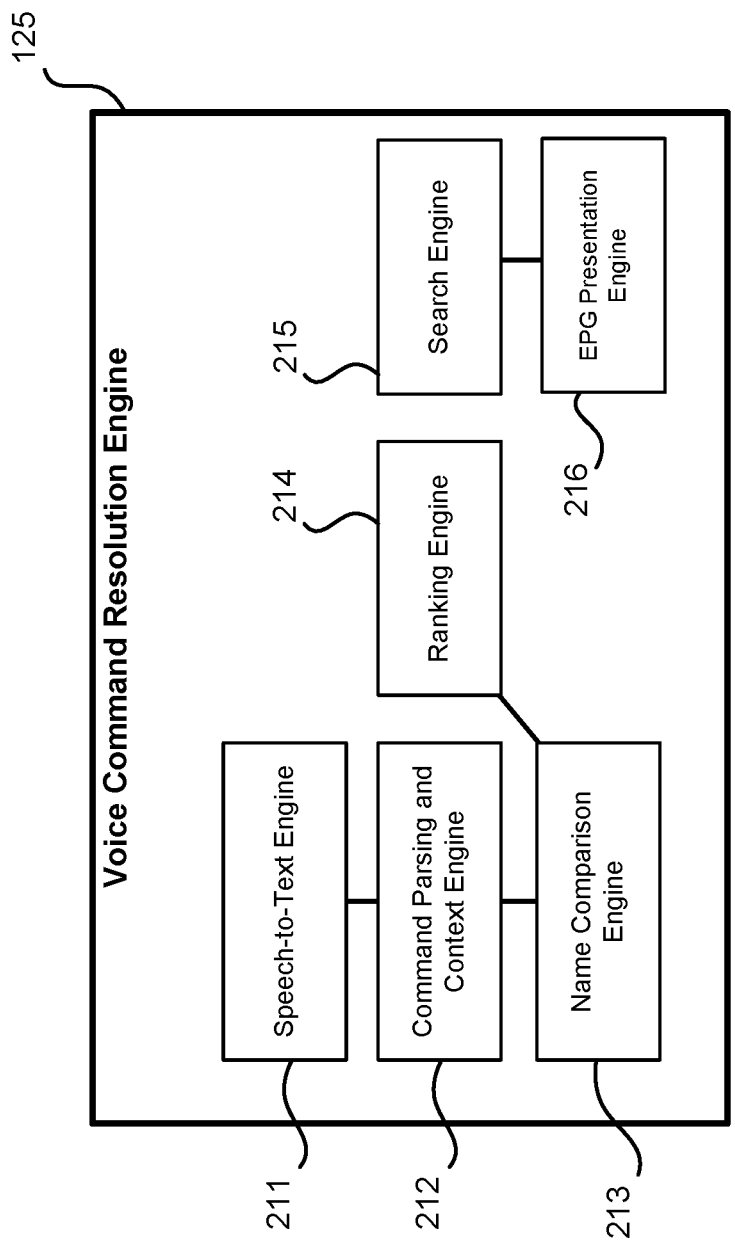
FIG. 2 illustrates an embodiment of a voice command resolution engine that may execute within a television receiver or other client device.

Referring now to FIG. 2, a detailed component diagram is shown for the voice command resolution engine 125 introduced in FIG. 1. As discussed above, in some embodiments, the voice command resolution engine 125 may execute within a television receiver device 120, and may be configured to receive, analyze, and process voice commands from users to access particular media content, such as television channels, specified programs, movies, music, etc. In this example, the voice command resolution engine 125 may be implemented within a television receiver 120, or other devices such as a modem, router, smartphone, etc., having one or more computer systems that include hardware components such as: hard drives, memory, processors, network interfaces, user interfaces, and communication buses. The voice command resolution engine 125 may itself be implemented in hardware, software, or a combination of hardware and software, and may include a speech to text engine 211, a spelling and context engine 212, a confirmation engine 213, a closest-to/ranking engine 214, a search engine 215, and an EPG presentation engine 216. These engines may be implemented using software or firmware executed by underlying hardware or by special-purpose computerized hardware. In some embodiments, functions of these engines may be combined into fewer software/firmware/hardware components or may be subdivided into a larger number of distinct software/firmware/hardware components.

Speech to text engine 211 may receive audio data of human speech commands received via the remote control 130 (or other audio input device) and transmitted to the television receiver 120. As noted above, the spoken commands from the user may include commands to play content, retrieve content, record content, delete content, navigate within the EPG, DVR, or other application, perform trickmodes, etc. These commands also may identify the particular content by name (e.g., a channel name, program name, movie name, etc.). In some embodiments, a user may press or button or otherwise actuate a feature on the remote control 130 or receiver 120 to begin recording the audio command. After receiving the command, the speech to text engine 211 may convert the audio speech into editable text.

The command parsing and context engine 212 may receive the text output from the speech to text engine 211, and may parse the text string determine what particular media content has been identified by the user, and/or what action should be performed on the identified media. For example, for a text string of "Change channel to ESPN," the command parsing and context engine 212 may parse and analyze the string to determine that an immediate channel change is requested and that the target of the channel change is "ESPN." For a text string of "Play Forest Gump," the command parsing and context engine 212 may parse and analyze the string to determine that a search should be performed within one or more data sources (e.g., the EPG listing, the current DVR recordings, available on-demand content, etc.) and the target of the search is the phrase "Forest Gump." As another example, for the text string of "Record NBC at six o'clock," the command parsing and context engine 212 may parse and analyze the string to determine that a future recording is be set at 6:00, and that the channel to be recorded is NBC. Additionally, the command parsing and context engine 212 may be configured to convert and/or strip out special characters (e.g., !, @, #, $, &, *, :, ', etc.) if necessary. For example, if the speech-to-text conversion engine 211 detects that a user has spoken or otherwise input a special character (e.g., by speaking the words "exclamation point," "dollar sign," etc.), then the parsing and context engine 212 may either convert those words back into the appropriate special character, or may strip out those characters altogether from the text string.

The name comparison engine 213 may receive the parsed data output from the command parsing and context engine 212, and compare the target media data (e.g., a channel, program, movie, etc.) to the media content listings stored by the television receiver 120 and/or television service provider 110. In some embodiments, the media target (or targets) received via the user's voice command may be initially compared to a listing of all available channels, programs, movies, music, audiobooks, podcasts, and any other available media provided by the television service provider 110.

In some cases, the comparison engine 213 might not identify an exact match to the requested media, for example, due to a speaking error by the user, a conversion error by the speech to text convertor 211, or a parsing error by the parser 212. In such cases, the comparison engine 213 may use additional data sources, such as content command resolution databases 150-152, to determine the actual content name intended by the user's spoken command. Such comparison techniques are described below in more detail in reference to FIG. 4.

In some embodiments, the name comparison engine 213 also may perform a closest match algorithm on the media target in the converted text string. In such examples, an absolute matching comparison may be performed between the speech-to-text input and the lists of channels/programs/etc., and the closest match may be selected. For example, if the speech-to-text conversion requests "TVM 24," the channel "TVN 24" may be identified as the closest match. As another example, if the speech-to-text conversion results the output text "GSPN2", then the channel "ESPN2" may be identified as the closest potential match, thus causing the receiver 120 to tune to or record channel ESPN2.

If an exact match is not found by the name comparison engine 213 (or at least a match with a confidence level greater than a predetermined confidence threshold), then in some cases the name comparison engine 213 might identify multiple potential name matches. In some examples, the television receiver 120 may cause an associated display device 135, such as a television, to present the converted speech-to-text command, including either a single determined target media (e.g., channel, program, movie, etc.) so that it may be confirmed by the user, or the multiple potential name matches for the target media so that the user may select the correct match via the remote control 130. In these examples, the content viewer may have the option to confirm, select the matching option, edit, or cancel the requested audio command. Additionally, the name comparison engine 213 may use a ranking engine 114 to determine which media targets were most likely intended during the spoken audio command. The ranking engine 114 may determine the likelihood that the user was verbally referring to one or more particular target media based on the various matching algorithms described below, include identifying exact matches, closest-to matches, partial matches, phonetic matches, etc. Additionally, the ranking engine 114 may use the overall popularity (and/or popularity for the specific user or household) of different television channels, programs, movies, etc., to determine the most likely intended media target from the user's audio command. For example, if a user's spoken request for a movie might be resolved into two similar sounding movie names, one of which is a popular movie newly available on-demand, and the other is an obscure film from 20 year ago, then the ranking engine 114 may take into account the popularity disparity of the movies to automatically select the first instead of the second. In some cases, the individual user's preferences for particular types of media, including media type, genre, actors, etc., may be used similarly by the ranking engine 114 to discern the user's intended selection.

In some embodiments, if the speech-to-text conversion, parsing, and/or name comparison processes are ambiguous, and the user is asked to confirm or reenter the target media selection, then the user's initial audio command and the user's subsequent confirmation (or selection/clarification) may be stored and used by the voice command resolution engine 125 to more efficiently resolve future audio commands from the same user. Thus, via machine learning and/or artificial intelligence based techniques, the voice command resolution engine 125 may learn and take into account the particular speaking patterns of individual users, such as their accents, errors or oddities in pronunciation, phraseology, and wording, and/or misspoken media names (e.g., misspoken, abbreviations, or partial names) of television channels, programs, etc.

In some embodiments, the data from spoken user commands and subsequent user interactions with resolution engine 125 (e.g., selection confirmations, clarifications, updates, etc.) may be analyzed and uploaded from individual television receivers 120 to the television service provider system 110. Thus, system 110 may receive common name data, common error data, partial name data, phonetic data, etc., from many different television receivers 120 used by many different users. The system 110 may analyze this data received from users via receivers 120, and incorporate this data into its databases 150-152. For embodiments in which the user's spoken command cannot be resolved (or at least cannot be resolved with a sufficient level of confidence), the television receiver 120 may submit the audio command as an Internet search, using search engine 215 to transmit searches in text and/or audio format to the Internet 140. Audio commands that cannot be resolved may correspond to requested media (e.g., television channels, programs, movies, etc.) that are not available from the television service provider 110, but may nonetheless be available from a separate Internet source. EPG presentation engine 216 also may adjust how requests for user confirmation or clarification, or search results, are indicated within the EPG provided by the television receiver 120.

In some embodiments, various parts the processing performed by voice command resolution engine 125 may be performed by the central television service provider system 110, and/or by other third-party software services accessed via the Internet 140. For example, in some embodiments, speech to text engine 211, comparison engine 213, and/or search engine 215 may be incorporated as part of the central system 110. Incorporation of other components of the television receiver 120 within the server system 110 may be possible. Additionally or alternatively, microphone 132 may be integrated as part of television receiver 120, or a separate connectable device (e.g., the user's smartphone, virtual assistant, etc.) rather than as part of remote control 130.

Figure 3:
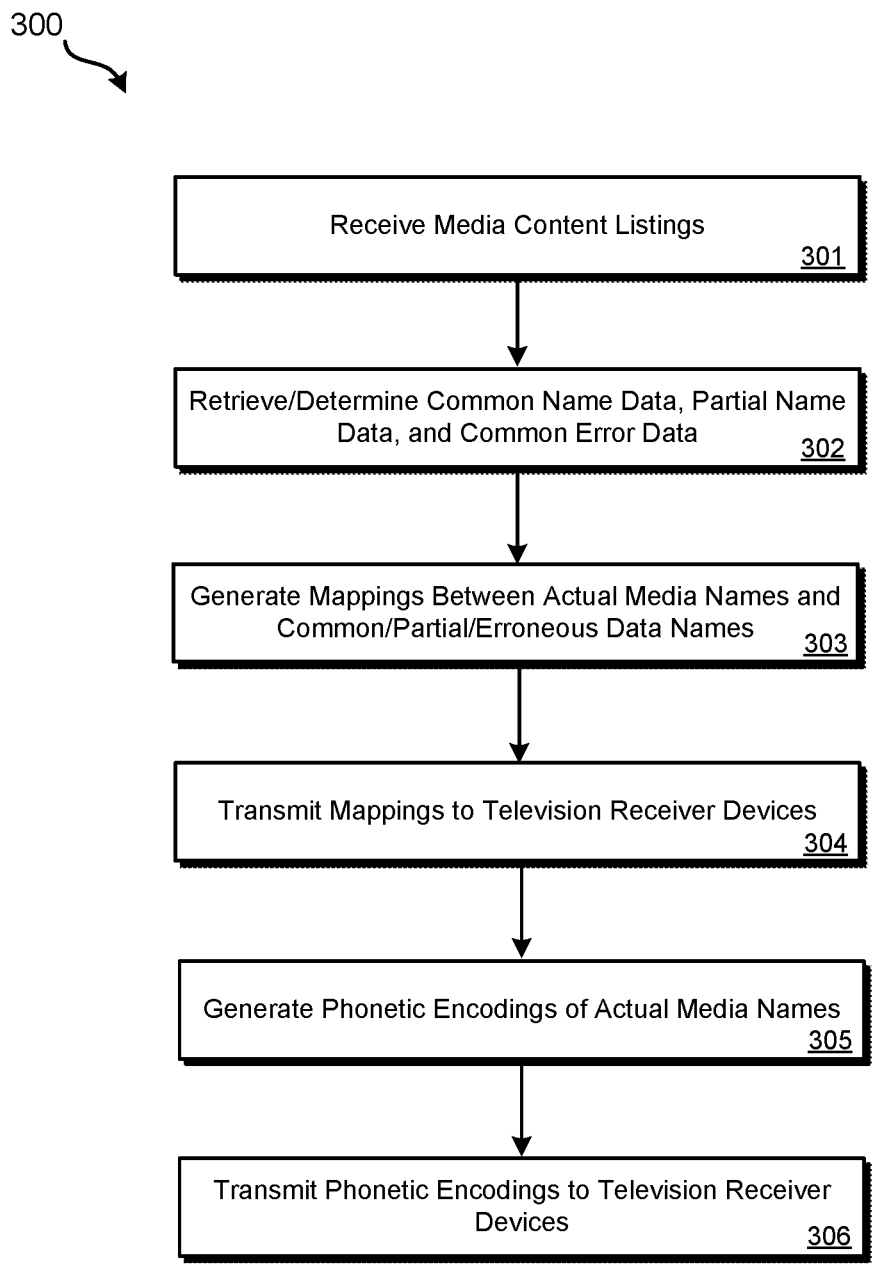
FIG. 3 illustrates an embodiment of a method for generating and transmitting content command resolution data.

Referring now to FIG. 3, a flowchart is shown illustrating a simplified method of generating content command resolution data, such as data from databases 150-152. As described below, some or all of the steps in this method may be performed by a central media content provider (e.g., television service provider system 110) configured to provide media content to a plurality of subscribers or client devices (e.g., television receivers 120). Additionally or alternatively, method 300 may be performed using the systems and devices of FIGS. 5 and 6. It should also be understood that any or all of the functionality described in this method may be performed by other systems or devices, such as the client devices themselves (e.g., television receivers 120) and/or third-party systems configured to generate content command resolution data that operate separately and independently from the central system 110.

In step 301, the television service provider system 110 may receive a set of media content listings. As noted above, the media content listings may correspond to television channel listings, television program listings, movie listings, music album listings, song listings, artist listings, musical channel listings, audiobook listings, or podcast listings, among others. The media content listing data may include may include the actual names (i.e., determined by the media content provider) of each media content item. In some cases, the listings in step 301 may be received by the a voice command resolution server module 115 from the other components of the system 110, and may correspond to the media content provided by the system 110 to its subscribers. In other cases, the listings may include additional media content provided by other third-party media providers to television receivers 120, or may include media content that is not available at all to the television receivers 120.

In step 302, the television service provider system 110 (e.g., the voice command resolution server module 115) may determine data related to the media content listings received in step 301. In some cases, this related data may be referred to as media content command resolution data, content-related data, etc., and may include any or all of the data discussed above in databases 150-152. For example, the related data received in step 302 may include "common name" listings, that is, one or more names for the media content items that are commonly-used or commonly-spoken names, but that are different from the actual media content names (e.g., the common name "FS1" instead of the actual television channel name "Fox Sports 1"). Other examples of related data may include listings of partial names instead of the actual television channel names, and/or erroneous names (e.g., errors in the title name, mispronunciations, etc.). In some embodiments, the voice command resolution server 115 may receive the related data in step 302 from one or more content providers and/or third-party data sources. For example, a number of television networks may maintain a listing of common names, partial names, etc., associated with their television channel names and all television program names aired on those channels, and may transmit the listings to the provider system 110 where the system 110 may aggregate the listings. In other examples, the voice command resolution server 115 may generate some or all of the related data in step 302, without receiving that data from external sources. For example, the server 115 may determine listings of common names, partial names, and/or erroneous names for each actual name within their media content listings by analyzing the actual names and performing such techniques as abbreviating or shortening the names, generating acronyms based on the names, changing tense, pluralizing or unpluralizing certain words, etc. Additionally or alternatively, the server 115 may generate common name data, partial name data, and/or erroneous name data by receiving and analyzing the requests for media content received from their subscribers via television receivers 120. For instance, a user may request an incorrect title that cannot be resolved, immediately followed by the related correct title name. If this occurs once or a threshold number of times for an incorrect title name, then that incorrect title name may be added to the common name listing.

In step 303, the television service provider system 110 may generate mappings between the actual names of the media content items received in step 301, and the common names, partial names, erroneous names, etc. received in step 302. The mappings may be generated in the form of database tables, with each actual name of a content media item (e.g., a television channel, program, movie, etc.) being associated in the tables with zero, one, or multiple different related names. In step 304, the mappings generated in step 303 may be transmitted from the content provider server (e.g., television service provider system 110) to the network of content media client devices (e.g., television receivers 120), so that each client device may store and use the related name data mappings to resolve spoken user requests for content media.

In step 305, the television service provider system 110 may receive or generate a set of phonetic encodings (or other pronunciation data) representing the names of the media content items received in step 301. In some embodiments, the voice command resolution server 115 or other components with the television service provider system 110 may generate the phonetic encodings using a double metaphone algorithm, Metaphone 3, and/or other phonetic or spoken language pronunciation algorithms. Alternatively, the phonetic/pronunciation data may be received from a separate third-party provider. In step 306, the phonetic encoding data may be transmitted from the television service provider system 110 to the television receivers 120, so that each receiver 120 may store and use the phonetic encoding data to resolve spoken user requests for content media. In some embodiments, the specific phonetic encoding data generated or received in step 305 may be based on the geographic location and/or user language settings, so that different phonetic encodings may be used for particular media content items (e.g., television channel names, program names, movie names, etc.) within different countries or regions, or for subsets of users having certain regional dialects or accents, etc. Accordingly, the server system 110 may transmit different copies of phonetic encodings to different client television receivers 120, based on the subscription package, geographic location, user language settings and preferences, and/or based on the previous spoken requests from the user.

Figure 4:
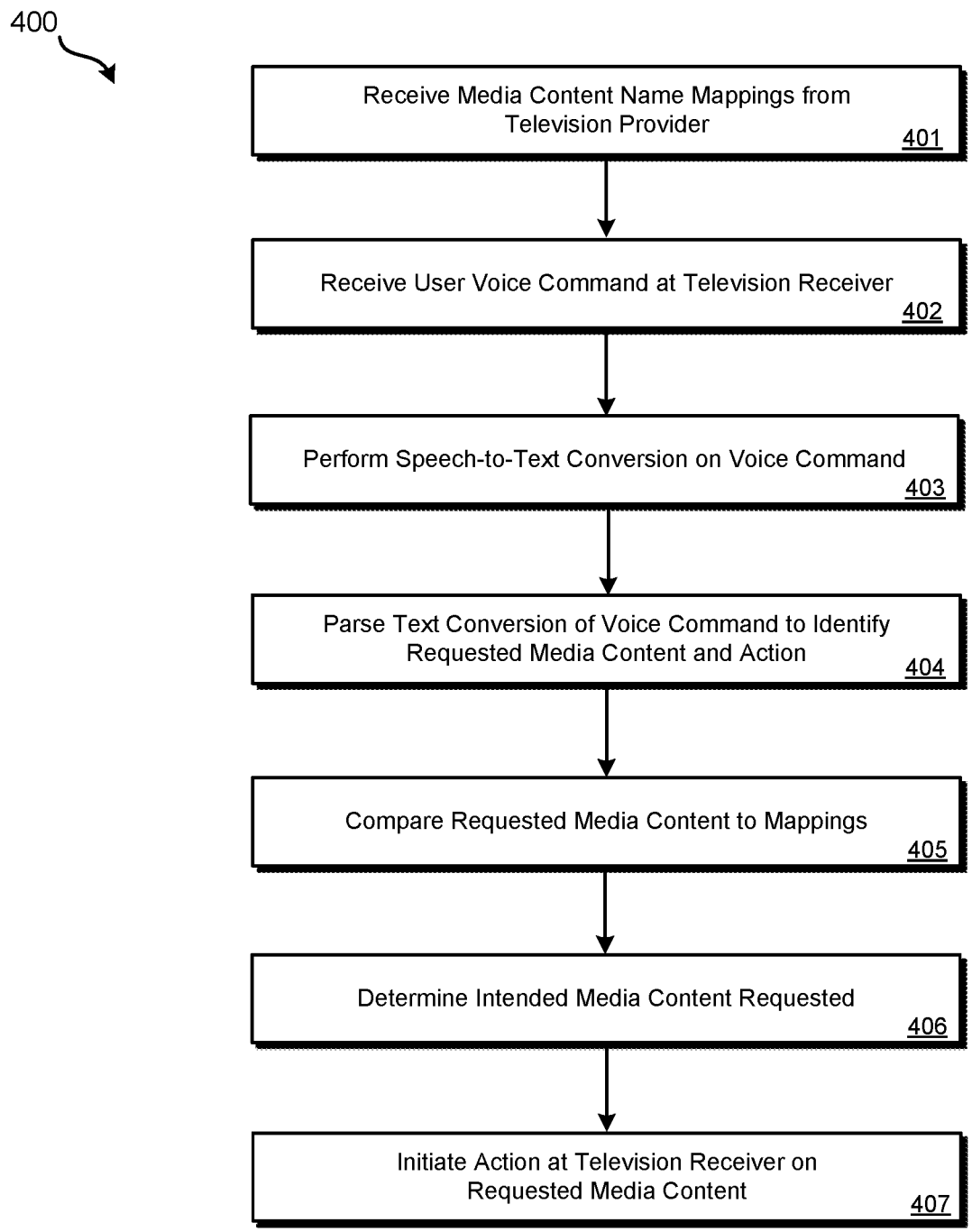
FIG. 4 illustrates an embodiment of a method for receiving and processing user voice commands for media content.

Referring now to FIG. 4, another flowchart is shown illustrating a method of receiving and processing user voice commands for media content. As described below, some or all of the steps in this method may be performed by a television receiver 120 or other media content client device, based on media content name mapping data received from a television service provider 110 or other server system. Additionally or alternatively, method 400 may be performed using the systems and devices of FIGS. 5 and 6. It should also be understood that any or all of the functionality described in this method may be performed by other systems or devices, such as a central content provider server, local modem/router device, smartphone or other client device, etc.

In step 401, the voice command resolution engine 125 executing on the television receiver 120 may receive one or more media content name mappings from the television service provider 110. These mappings may correspond to the mappings generated and/or transmitted by the provider system 110, discussed above in FIG. 3. In various embodiments, a television receiver 120 (or any other client device for playing media content) may receive media content name mappings from a single television provider system 110, or from a combination of multiple television providers and/or third-party systems.

In some cases, a television receiver 120 may receive transmissions of media content name mappings from a server system 110, which may be transmitted periodically or in response to media content title data being updated within the system 110. Additionally or alternatively, the television receiver 120 may request updates of media content name mappings from the server system 110, for example, in response to unsuccessful voice commands and/or spoken media content names that cannot be resolved by the television receiver 120. For instance, the television receiver 120 may simply request updated media content name mappings in response to N number (or N percentage) of unresolvable media content names, and in some cases such requests may include the portion of the voice command audio and/or converted text including the requested media content.

In step 402, the television receiver 120 may receive a voice command from a user that identifies a particular media content. As discussed above, the voice command may be received via a remote control 130 or other client device. Generally (although not necessarily) a user voice command may identify both a media content and an action to be performed with respect to the media content. Thus, examples of a user voice commands may include "Record the Hallmark Channel," "Tune to ESPNU," "Play Christmas Vacation," or "Watch Friends." Certain voice commands also may include additional information such as times, types of the requested media content, and/or other media content metadata (e.g., genre, actors, release date, etc.). For instance, other examples of voice commands may include, "Record the 1987 version of the movie Wall Street," "Change to the football game," "Watch the Sandra Bullock movie on HBO," etc.

In step 403, the television receiver 120 may perform a speech-to-text conversion process on the audio clip corresponding to the voice command received in step 402. As discussed above, the speech-to-text conversion in step 403 may be performed by a speech-to-text engine 211 within the voice command resolution engine 125 executing on the television receiver 120. In other examples, the speech-to-text conversion may be performed outside of the television receiver 120, by the server system 110 and/or a third-party system. In step 404, the television receiver 120 may parse the output text from the speech-to-text conversion in step 403, using a parsing and context engine 212. The parsing process in step 404 may include, among other steps, analyzing the text of the user's voice command to determine (i) a particular media content item and (ii) an action to be performed with respect to that particular media content item. The particular media content items identified in a voice command may include, for example, television channels, television programs, movies, songs, music channels, albums, artists, actors, etc. The determined actions requested by the user may include actions such as playing the media content, recording the media content, deleting the media content, selecting the content media (to review metadata and see related information), etc. Additionally, as noted above, the speech-to-text conversion in step 403 and/or the parsing process in step 404 may include identifying one or more special characters (e.g., !, @, #, $, &, *, :, ', etc.), and then either converting or stripping out those special characters from the output text string. For example, if the speech-to-text conversion engine 211 detects that a user has spoken or otherwise input a special character (e.g., by speaking the words "exclamation point," "dollar sign," etc.), then in steps 403 or 404 a parsing and context engine 212 may either convert those words back into the appropriate special character (e.g., "!" or $", etc.), or may strip out those characters altogether from the text string.

In step 405, the television receiver 120 may compare the particular media item (or items) identified within the user's voice command in step 404, to the media content name mappings received in step 401. In some embodiments, an initial comparison may be made between the text of the particular media item and the actual media content names. If the text exactly matches a content media name, then it may be unnecessary to compare the text to the related name mappings received in step 401. When the text of the particular media content does not exactly match any of the actual content names, then the comparison(s) in step 405 may be initiated.

As noted above, step 405 may include comparisons of multiple different types of media content name mappings, such as common names, partial names, erroneous names, and phonetic encoding mappings. In some embodiments, step 405 may include performing some or all of these different comparisons together at the same time. In other embodiments, theses multiple comparisons may be sequentially. For example, in step 405 the comparison engine 213 of the television receiver 120 might first compare the text of the media content item from the voice command to a first listing of common names (e.g., corresponding to database 150). If a match is found within the common name listing, then the television receiver 120 may conclude that match was the intended media content in the user's spoken command and stop the processing of step 405. However, if a match is not found within the common name listing, the comparison engine 213 might then compare the text of the media content item from the voice command to a second listing of partial names (e.g., corresponding to database 151), and so on. Finally, if a match is not found within the common name mappings, partial name mappings, erroneous name mappings, etc., the comparison engine 213 might finally compare the text of the media content item from the voice command to the phonetic name mappings (e.g., corresponding to database 152), and so on. It should also be understood that the sequence of these comparisons may be different in different embodiments.

The following examples illustrate possible comparison processes in step 405, between the speech-to-text output of the media content item identified in a voice command, and one or more name mappings. As a first example, if a user requests to watch "Hallmark Movies," then a name mapping in a common name data store may map the spoken name of "Hallmark Movies" to the actual television channel name of the "Hallmark Channel," and the television receiver 120 may be configured to change the current channel on the receiver 120 to the Hallmark Channel. As another example, if the user speaks a request to play "V.I. Warshawski," then a mapping of phonetic encodings may be used to determine the movie title based on the user's spoken request, even if the speech-to-text output text does not resemble the correct spelling of "V.I. Warshawski," and the television receiver 120 may then retrieve and play the movie. As another example, the comparison engine 213 may resolve a voice command for "Borat," to the actual movie title of "Borat: Cultural Learnings of America for Make Benefit Glorious Nation of Kazakhstan," using a mapping of common names or partial names, etc. As another example, the comparison engine 213 may resolve a voice command for "I love Huckabees" or "I heart Huckabees," to the actual movie title of "I ♥ Huckabees," using mapping of common names or erroneous names, etc. As another example, the comparison engine 213 may resolve a voice command for "TCM" to the television channel "Turner Classic Movies," using mapping of common names or acronyms, and may initiate a channel change or recording to the "Turner Classic Movies" channel in response to the name command resolution. As yet another example, a spoken voice command for "the BBC Channel" or just "BBC" may be resolved using name mappings to "BBC America," whenever based on the particular country, region, or subscription of the television receiver 120, the BBC network is not available but BBC America is available. As another example, the comparison engine 213 may resolve a voice command for "Special Victims Unit," to the actual television program title of "Law & Order: Special Victims Unit," using a mapping of common names or partial names, etc.

In step 406, the television receiver 120 may analyze the results of the comparison(s) performed in step 405 to determine which media content was requested in the user's voice command. In some cases, step 406 may involve simply selecting the actual media content that matches the text of the media content item from the voice command, based on any of the comparisons discussed above. For instance, if there is exactly one match found in step 405 between the text of the media content item from the voice command, and a common name listing, a partial name listing, an erroneous name listing, etc., then in step 406 the actual name of the media content corresponding to the match may be selected. However, other techniques may be used in step 406 as well. For example, if no exact matches are found in step 405 between the voice command text and a common name/partial name/erroneous name/phonetic name/etc., or if multiple matches are found that map to different media content items, then in step 406 the comparison engine 213 may perform additional analysis to determine which actual media content item was intended by the user's voice command. For example, the comparison engine 213 and/or ranking engine may identify multiple potential media content items that may have be intended by the user's voice command, and/or may determine a ranking among them. The ranking may be determined by executing a closest-to algorithm, selecting or weighting the most popular media content items, and/or based on the user's previously media content selections. In some cases, if the media content identified in the user's voice command is ambiguous, the television receiver 120 may present a user interface allowing the user to confirm the media content selection determined to be the most likely, or to select from the multiple potential media content selections identified in step 406.

In step 407, after identifying the correct media content item from the user's spoken command, the television receiver 120 may initiate the action on that media item. Thus, in step 407, the television receiver 120 may tune to a particular television channel or program, set a DVR recording for a particular channel or program, retrieve and play a program from the DVR storage of the receiver 120, select and retrieve a program from an EPG listing, select, purchase and/or play a program, movie, or other media from an on-demand service of the television provider or other third-party content provider.

Figure 5:
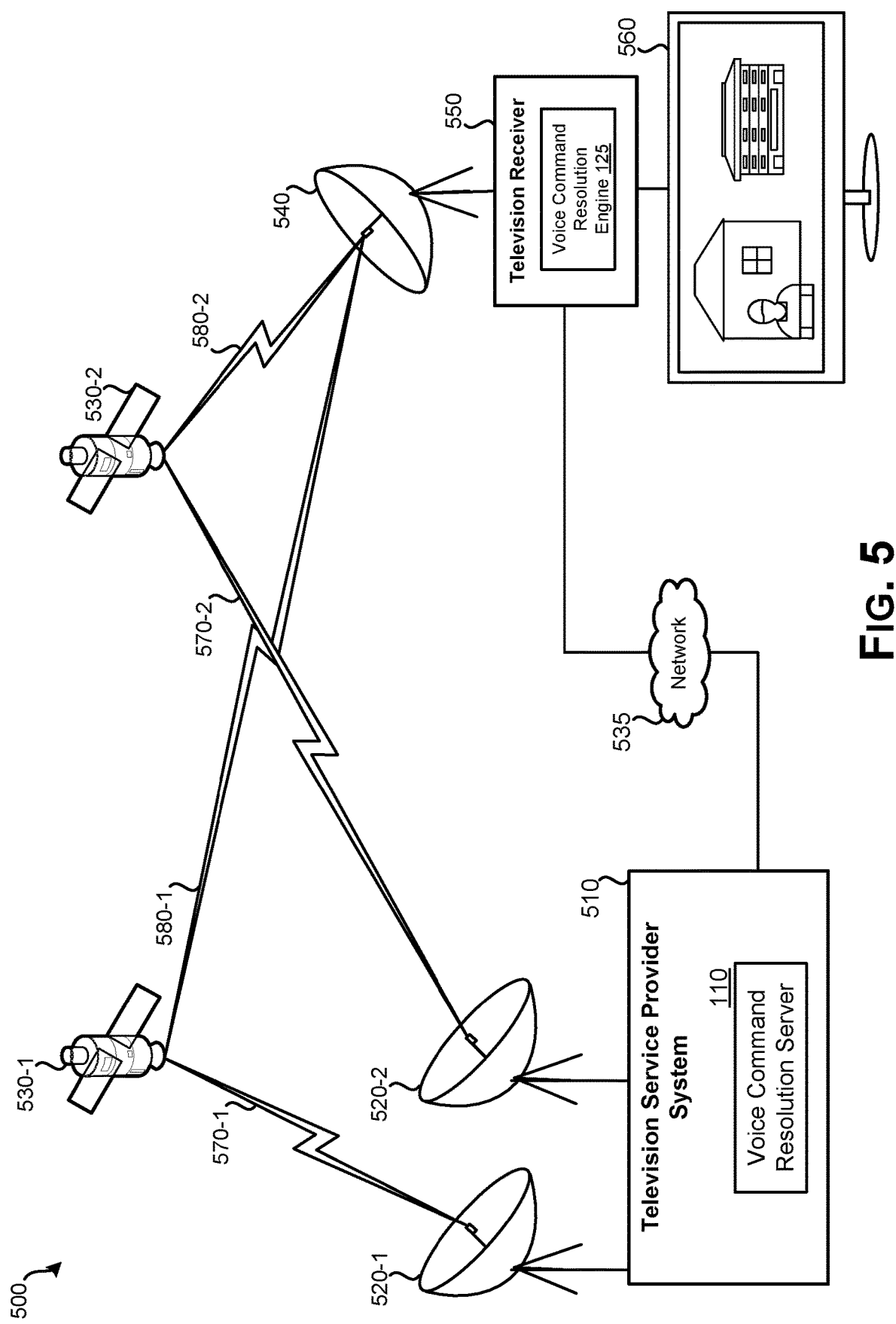
FIG. 5 illustrates an embodiment of a satellite-based television distribution system.

FIG. 5 illustrates an embodiment of a satellite-based television distribution system 500. Such an arrangement may be used for generating and distributing media content name mapping data, and for receiving and resolving voice commands, as discussed above in methods 300 and 400. Satellite-based television distribution system 500 may include: television service provider system 510, satellite transmitter equipment 520, satellites 530, satellite antenna 540, television receiver 550 (which can represent an embodiment of television receiver 120), and display device 560. Alternate embodiments of satellite-based television distribution system 500 may include fewer or greater numbers of components. While only one satellite antenna 540, television receiver 550, and display device 560 (which can collectively be referred to as "user equipment") are illustrated, it should be understood that multiple (e.g., tens, thousands, millions) instances of user equipment may receive television signals from television service provider system 510 via satellites 530.

Television service provider system 510 and satellite transmitter equipment 520 may be operated by a television service provider. A television service provider may distribute television channels, on-demand programming, programming information, and/or other content/services to users. Television service provider system 510 may receive feeds of one or more television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 520 (120-1, 520-2) may be used to transmit a feed of one or more television channels from television service provider system 510 to one or more satellites 530. While a single television service provider system 510 and satellite transmitter equipment 520 are illustrated as part of satellite-based television distribution system 500, it should be understood that multiple instances of transmitter equipment may be used, possibly scattered geographically, to communicate with satellites 530. Such multiple instances of satellite transmitting equipment may communicate with the same or with different satellites. Different television channels may be transmitted to satellites 530 from different instances of transmitting equipment. For instance, a different satellite antenna of satellite transmitter equipment 520 may be used for communication with satellites in different orbital slots. Television service provider system 510 may operate the voice command resolution server 115, as detailed in relation to FIG. 1. In some embodiments, media content name mappings, including entries from mappings databases 150-152, may be broadcast via satellites 530 to television receiver 120 to allow voice commands to be resolved locally. Some television receivers may not be able to communicate via network 535; therefore, to allow such television receivers to perform searches, such mappings may need to be transmitted via satellites 530 for storage locally by the television receivers 120.

Satellites 530 may be configured to receive signals, such as streams of television channels, from one or more satellite uplinks such as satellite transmitter equipment 520. Satellites 530 may relay received signals from satellite transmitter equipment 520 (and/or other satellite transmitter equipment) to multiple instances of user equipment via transponder streams. Different frequencies may be used for uplink signals 570 from transponder streams 580. Satellites 530 may be in geosynchronous orbit. Each of the transponder streams transmitted by satellites 530 may contain multiple television channels transmitted as packetized data. For example, a single transponder stream may be a serial digital packet stream containing multiple television channels. Therefore, packets for multiple television channels may be interspersed.

Multiple satellites 530 may be used to relay television channels from television service provider system 510 to satellite antenna 540. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 530-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite antenna 540 may be a piece of user equipment that is used to receive transponder streams from one or more satellites, such as satellites 530. Satellite antenna 540 may be provided to a subscriber for use on a subscription basis to receive television channels provided by the television service provider system 510, satellite transmitter equipment 520, and/or satellites 530. Satellite antenna 540, which may include one or more low noise blocks (LNBs), may be configured to receive transponder streams from multiple satellites and/or multiple transponders of the same satellite. Satellite antenna 540 may be configured to receive television channels via transponder streams on multiple frequencies along with other transmitted data (e.g., encryption keys). Based on the characteristics of television receiver 550 and/or satellite antenna 540, it may only be possible to capture transponder streams from a limited number of transponders concurrently. For example, a tuner of television receiver 550 may only be able to tune to a single transponder stream from a transponder of a single satellite at a given time. The tuner can then be re-tuned to another transponder of the same or a different satellite. A television receiver 550 having multiple tuners may allow for multiple transponder streams to be received at the same time.

Figure 6:
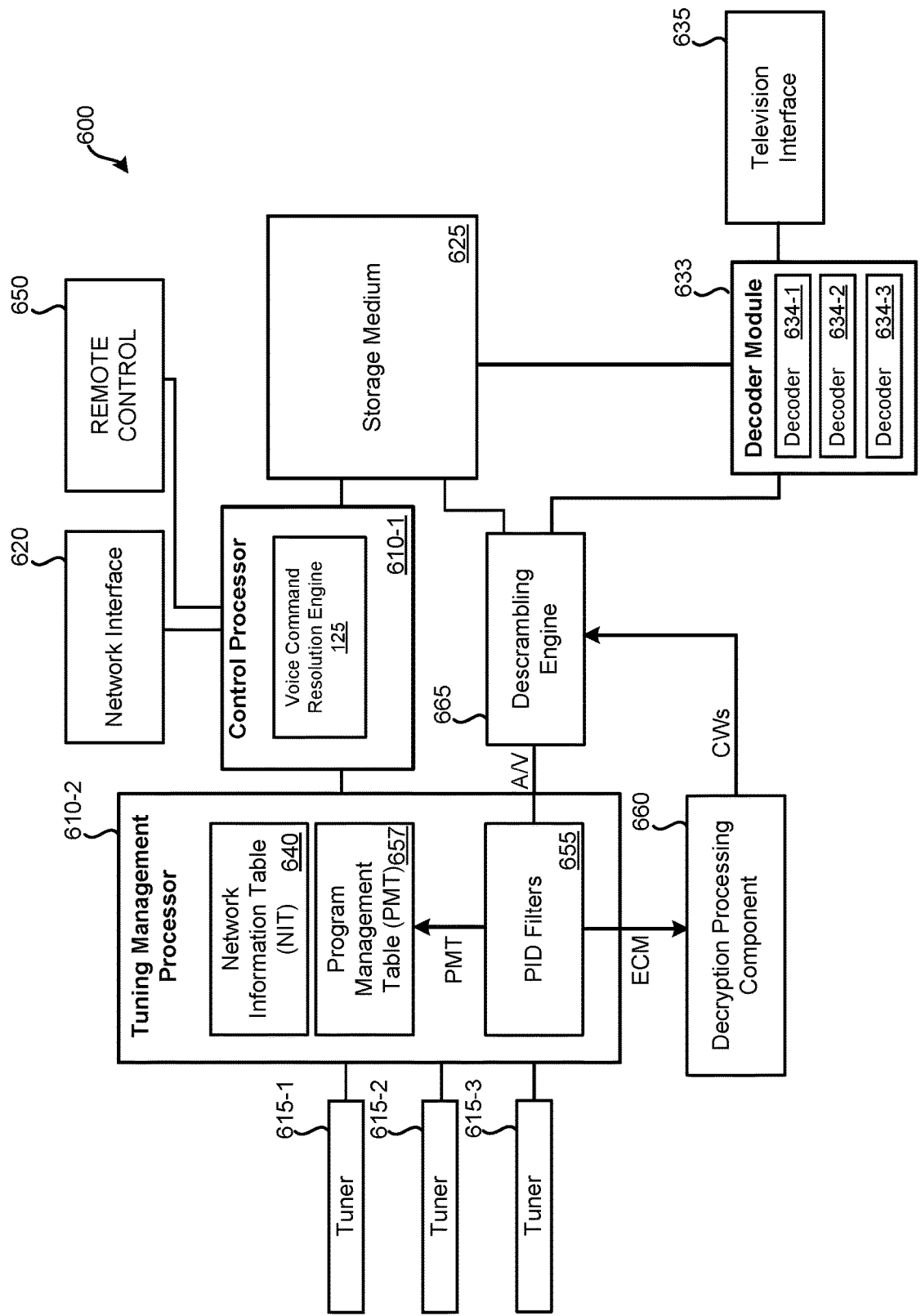
FIG. 6 illustrates an embodiment of a television receiver.

In communication with satellite antenna 540 may be one or more television receivers. Television receivers may be configured to decode signals received from satellites 530 via satellite antenna 540 for output and presentation via a display device, such as display device 560. A television receiver may be incorporated as part of a television or may be part of a separate device, commonly referred to as a set-top box (STB). Television receiver 550 may decode signals received via satellite antenna 540 and provide an output to display device 560. FIG. 6 provides additional detail of various embodiments of a television receiver. A television receiver is defined to include STBs and also circuitry having similar functionality that may be incorporated with another device. For instance, circuitry similar to that of a television receiver may be incorporated as part of a television. As such, while FIG. 5 illustrates an embodiment of television receiver 550 as separate from display device 560, it should be understood that, in other embodiments, similar functions may be performed by a television receiver integrated with display device 560.

Display device 560 may be used to present video and/or audio decoded and output by television receiver 550. Television receiver 550 may also output a display of one or more interfaces to display device 560, such as an electronic programming guide (EPG). In many embodiments, display device 560 is a television. Display device 560 may also be a monitor, computer, or some other device configured to display video and, possibly, play audio.

Uplink signal 570-1 represents a signal between satellite transmitter equipment 520 and satellite 530-1. Uplink signal 570-2 represents a signal between satellite transmitter equipment 520 and satellite 530-2. Each of uplink signals 570 may contain streams of one or more different television channels. For example, uplink signal 570-1 may contain a first group of television channels, while uplink signal 570-2 contains a second group of television channels. Each of these television channels may be scrambled such that unauthorized persons are prevented from accessing the television channels.

Transponder stream 580-1 represents a transponder stream signal between satellite 530-1 and satellite antenna 540. Transponder stream 580-2 represents a transponder stream signal between satellite 530-2 and satellite antenna 540. Each of transponder streams 580 may contain one or more different television channels, which may be at least partially scrambled. For example, transponder stream 580-1 may be a first transponder stream containing a first group of television channels, while transponder stream 580-2 may be a second transponder stream containing a different group of television channels. When a television channel is received as part of a transponder stream and is decoded and output to display device 560 (rather than first storing the television channel to a storage medium as part of DVR functionality, then later outputting the television channel from the storage medium), the television channel may be considered to be viewed "live."

FIG. 5 illustrates transponder stream 580-1 and transponder stream 580-2 being received by satellite antenna 540 and distributed to television receiver 550. For a first group of television channels, satellite antenna 540 may receive transponder stream 580-1 and for a second group of channels, transponder stream 580-2 may be received. Television receiver 550 may decode the received transponder streams. As such, depending on which television channels are desired to be presented or stored, various transponder streams from various satellites may be received, descrambled, and decoded by television receiver 550.

Network 535, which can be the Internet, may serve as a secondary communication channel between television service provider system 510 and television receiver 550. Via such a secondary communication channel, bidirectional exchange of data may occur. As such, data may be transmitted to television service provider system 510 from television receiver 550 via network 535. Data may also be transmitted from television service provider system 510 to television receiver 550 via network 535.

FIG. 6 illustrates an embodiment of television receiver 600. It should be understood that television receiver 600 can represent a more detailed embodiment of television receiver 120. Television receiver 600 may be configured to provide an audio input interface that allows for receiving, resolving, and performing voice commands as described above. Television receiver 600 may be in the form of a separate device configured to be connected with a display device, such as a television. Embodiments of television receiver 600 can include set top boxes (STBs). As previously noted, in addition to being in the form of an STB, a television receiver may be incorporated as part of another device, such as a television or other form of display device. For example, a television may have an integrated television receiver (which does not involve an external STB being coupled with the television).

Television receiver 600 may represent television receiver 120 of FIG. 1 and may be in the form of an STB that outputs video and/or audio to a display device, such as a television. Television receiver 600 may be incorporated as part of a television, such as display device 560 of FIG. 5. Television receiver 600 may include: processors 610 (which may include control processor 610-1, tuning management processor 610-2, and possibly additional processors), tuners 615, network interface 620, non-transitory computer-readable storage medium 625, electronic programming guide (EPG) database 630, television interface 635, networking information table (NIT) 640, digital video recorder (DVR) database 645 (which may include provider-managed television programming storage and/or user-defined television programming), remote control 650, decryption processing component 660 (which can be in the form of a removable or non-removable smartcard), and/or descrambling engine 665. In other embodiments of television receiver 600, fewer or greater numbers of components may be present. It should be understood that the various components of television receiver 600 may be implemented using hardware, firmware, software, and/or some combination thereof. Functionality of components may be combined; for example, functions of descrambling engine 665 may be performed by tuning management processor 610-2. Further, functionality of components may be spread among additional components; for example, PID (packet identifier) filters 655 may be handled by separate hardware from program management table (PMT) 657.

Processors 610 may include one or more specialized and/or general-purpose processors configured to perform processes such as tuning to a particular channel, accessing and displaying EPG information from an EPG database, and/or receiving and processing input from a user. For example, processors 610 may include one or more processors dedicated to decoding video signals from a particular format, such as MPEG, for output and display on a television and for performing decryption. It should be understood that the functions performed by various modules of FIG. 6 may be performed using one or more processors. As such, for example, functions of descrambling engine 665 may be performed by control processor 610-1.

Control processor 610-1 may communicate with tuning management processor 610-2. Control processor 610-1 may control the recording of television channels based on timers stored in a DVR database. Control processor 610-1 may also provide commands to tuning management processor 610-2 when recording of a television channel is to cease. In addition to providing commands relating to the recording of television channels, control processor 610-1 may provide commands to tuning management processor 610-2 that indicate television channels to be output to decoder module 633 for output to a display device. Control processor 610-1 may also communicate with network interface 620 and remote control 650. Control processor 610-1 may handle incoming data from network interface 620 and remote control 650. Additionally, control processor 610-1 may be configured to output data via network interface 620. Control processor 610-1 may include a voice command resolution engine 125. Voice command resolution engine 125 may be configured to receive, resolve, and perform user voice commands for media content, as discussed above.

Tuners 615 may include one or more tuners used to tune to transponders that include broadcasts of one or more television channels. In the illustrated embodiment of television receiver 600, three tuners are present (tuner 615-1, tuner 615-2, and tuner 615-3). In other embodiments, two or more than three tuners may be present, such as four, six, or eight tuners. Each tuner contained in tuners 615 may be capable of receiving and processing a single transponder stream from a satellite transponder at a given time. As such, a single tuner may tune to a single transponder stream at a given time. If tuners 615 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 615 may be used to receive the signal containing the multiple television channels for presentation and/or recording. Tuners 615 may receive commands from tuning management processor 610-2. Such commands may instruct tuners 615 which frequencies or transponder streams to tune.

Network interface 620 may be used to communicate via an alternate communication channel with a television service provider, if such communication channel is available. The primary communication channel may be via satellite (which may be unidirectional to television receiver 600) and the alternate communication channel (which may be bidirectional) may be via a network, such as the Internet. Referring back to FIG. 5, television receiver 550 may be able to communicate with television service provider system 510 via a network, such as the Internet. This communication may be bidirectional: data may be transmitted from television receiver 550 to television service provider system 510 and from television service provider system 510 to television receiver 550. Referring back to FIG. 6, network interface 620 may be configured to communicate via one or more networks, such as the Internet, to communicate with television service provider system 510 of FIG. 5. Information may be transmitted and/or received via network interface 620. For instance, instructions (e.g., regarding subscription portability, MCVE definitions) from a television service provider may also be received via network interface 620, if connected with the Internet. Network interface 620 may be used to provide a confirmation to a television service provider that instructions received from the television service provider have indeed been executed.

Storage medium 625 may represent one or more non-transitory computer-readable storage mediums. Storage medium 625 may include memory and/or a hard drive. Storage medium 625 may be used to store information received from one or more satellites and/or information received via network interface 620. Storage medium 625 may store information related to EPG entries, recorded content, and/or on-demand programming. Recorded television programs, which were recorded based on a provider- or user-defined timer may be stored using storage medium 625 as part of a DVR database. Storage medium 625 may be partitioned or otherwise divided (such as into folders) such that predefined amounts of storage medium 625 are devoted to storage of television programs recorded due to user-defined timers and stored television programs recorded due to provider-defined timers.

The network information table (NIT) 640 may store information used by television receiver 600 to access various television channels. NIT 640 may be stored locally by a processor, such as tuning management processor 610-2 and/or by storage medium 625. Information used to populate NIT 640 may be received via satellite (or cable) through tuners 615 and/or may be received via network interface 620 from the television service provider. As such, information present in NIT 640 may be periodically updated. In some embodiments, NIT 640 may be locally-stored by television receiver 600 using storage medium 625. Generally, NIT 640 may store information about a service provider network, such as a satellite-based service provider network. Information that may be present in NIT 640 may include: television channel numbers, satellite identifiers (which may be used to ensure different satellites are tuned to for reception of timing signals), frequency identifiers and/or transponder identifiers for various television channels. In some embodiments, NIT 640 may contain additional data or additional tables may be stored by the television receiver. For example, while specific audio PIDs and video PIDs may not be present in NIT 640, a channel identifier may be present within NIT 640 which may be used to look up the audio PIDs and video PIDs in another table, such as a program map table (PMT). In some embodiments, a PID associated with the data for the PMT is indicated in a separate table, program association table (PAT), which is not illustrated in FIG. 6. A PAT may be stored by the television receiver in a similar manner to the NIT. For example, a PMT may store information on audio PIDs, and/or video PIDs. A PMT stores data on ECM (entitlement control message) PIDs for television channels that are transmitted on a transponder frequency. If, for a first television channel, multiple television channels are to be tuned to, NIT 640 and/or PMT 657 may indicate a second television channel that is to be tuned to when a first channel is tuned to.

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

Decoder module 633 may serve to convert encoded video and audio into a format suitable for output to a display device. For instance, decoder module 633 may receive MPEG video and audio from storage medium 625 or descrambling engine 665 to be output to a television. MPEG video and audio from storage medium 625 may have been recorded to DVR database 645 as part of a previously-recorded television program. Decoder module 633 may convert the MPEG video and audio into a format appropriate to be displayed by a television or other form of display device and audio into a format appropriate to be output from speakers, respectively. Decoder module 633 may have the ability to convert a finite number of television channel streams received from storage medium 625 or descrambling engine 665 simultaneously. For instance, each of decoders 634 within decoder module 633 may be able to only decode a single television channel at a time. While decoder module 633 is illustrated as having three decoders 634 (decoder 634-1, decoder 634-2, and decoder 634-3), in other embodiments, a greater or fewer number of decoders may be present in television receiver 600.

Television interface 635 may serve to output a signal to a television (or another form of display device) in a proper format for display of video and playback of audio. As such, television interface 635 may output one or more television channels, stored television programming from storage medium 625 (e.g., television programs from DVR database, television programs from on-demand programming and/or information from a locally-stored EPG database) to a television for presentation.

Digital Video Recorder (DVR) functionality may permit a television channel to be recorded for a period of time. DVR functionality of television receiver 600 may be managed by control processor 610-1. Control processor 610-1 may coordinate the television channel, start time, and stop time of when recording of a television channel is to occur. DVR database 645 may store information related to the recording of television channels. DVR database 645 may store timers that are used by control processor 610-1 to determine when a television channel should be tuned to and its programs recorded to DVR database 645 of storage medium 625. In some embodiments, a limited amount of storage medium 625 may be devoted to DVR database 645. Timers may be set by the television service provider and/or one or more users of television receiver 600.

DVR database 645 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 600 via the television provider's network. For example, referring to satellite-based television distribution system 500 of FIG. 5, in a satellite-based television service provider system, data necessary to create the provider-defined timers at television receiver 550 may be received via satellite.

As an example of DVR functionality of television receiver 600 being used to record based on provider-defined timers, a television service provider may configure television receiver 600 to record television programming on multiple, predefined television channels for a predefined period of time, on predefined dates. For instance, a television service provider may configure television receiver 600 such that television programming may be recorded from 6 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 625 for provider-managed television programming storage.

Remote control 650 (physically separate from television receiver 600) may allow a user to interact with television receiver 600. Remote control 650 may be used to select a television channel for viewing, record audio clips via an on-board microphone, view information from an EPG database, and/or program a timer stored to DVR database 645. In some embodiments, it may be possible to load some or all of preferences to a remote control. As such, the remote control can serve as a backup storage device for the preferences.

Referring back to tuners 615, television channels received via satellite (or cable) may contain at least some scrambled data. Packets of audio and video may be scrambled to prevent unauthorized users (e.g., nonsubscribers) from receiving television programming without paying the television service provider. When a tuner of tuners 615 is receiving data from a particular transponder of a satellite, the transponder stream may be a series of data packets corresponding to multiple television channels. Each data packet may contain a packet identifier (PID), which, in combination with NIT 640 and/or PMT 657, can be determined to be associated with a particular television channel. Particular data packets, referred to as entitlement control messages (ECMs), may be periodically transmitted. ECMs may be associated with another PID and may be encrypted; television receiver 600 may use decryption engine 661 of decryption processing component 660 to decrypt ECMs. Decryption of an ECM may only be possible if the user has authorization to access the particular television channel associated with the ECM. When an ECM is determined to correspond to a television channel being stored and/or displayed, the ECM may be provided to decryption processing component 660 for decryption. A special addressed packet or series of packets may be used to transmit a key to television receiver 600 for storage and/or distribution to a VR device.

When decryption processing component 660 receives an encrypted ECM, decryption processing component 660 may decrypt the ECM to obtain some number of control words. In some embodiments, from each ECM received by decryption processing component 660, two control words are obtained. In some embodiments, when decryption processing component 660 receives an ECM, it compares the ECM to the previously received ECM. If the two ECMs match, the second ECM is not decrypted because the same control words would be obtained. In other embodiments, each ECM received by decryption processing component 660 is decrypted; however, if a second ECM matches a first ECM, the outputted control words will match; thus, effectively, the second ECM does not affect the control words output by decryption processing component 660. Decryption processing component 660 may be permanently part of television receiver 600 or may be configured to be inserted and removed from television receiver 600.

Tuning management processor 610-2 may be in communication with tuners 615 and control processor 610-1. Tuning management processor 610-2 may be configured to receive commands from control processor 610-1. Such commands may indicate when to start/stop recording a television channel and/or when to start/stop causing a television channel to be output to a television. Tuning management processor 610-2 may control tuners 615. Tuning management processor 610-2 may provide commands to tuners 615 that instruct the tuners which satellite, transponder, and/or frequency to tune to. From tuners 615, tuning management processor 610-2 may receive transponder streams of packetized data. As previously detailed, some or all of these packets may include a PID that identifies the content of the packet.

Tuning management processor 610-2 may be configured to create one or more PID filters 655 that sort packets received from tuners 615 based on the PIDs. When a tuner is initially tuned to a particular frequency (e.g., to a particular transponder of a satellite), a PID filter may be created based on the PMT data. The PID filter created, based on the PMT data packets, may be known because it is stored as part of NIT 640 or another table, such as a program association table (PAT). From the PMT data packets, PMT may be constructed by tuning management processor 610-2.

PID filters 655 may be configured to filter data packets based on PIDs. In some embodiments, PID filters 655 are created and executed by tuning management processor 610-2. For each television channel to be output for presentation or recorded, a separate PID filter may be configured. In other embodiments, separate hardware may be used to create and execute such PID filters. Depending on a television channel selected for recording/viewing, a PID filter may be created to filter the video and audio packets associated with the television channel (based on the PID assignments present in PMT 657). For example, if a transponder data stream includes multiple television channels, data packets corresponding to a television channel that is not desired to be stored or displayed by the user may be ignored by PID filters 655. As such, only data packets corresponding to the one or more television channels desired to be stored and/or displayed may be filtered and passed to either descrambling engine 665 or decryption processing component 660; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 640, may be appropriately routed by PID filters 655. At a given time, one or multiple PID filters may be executed by tuning management processor 610-2.

Descrambling engine 665 may use the control words output by decryption processing component 660 in order to descramble video and/or audio corresponding to television channels for storage and/or presentation. Video and/or audio data contained in the transponder data stream received by tuners 615 may be scrambled. Video and/or audio data may be descrambled by descrambling engine 665 using a particular control word. Which control word output by decryption processing component 660 to be used for successful descrambling may be indicated by a scramble control identifier present within the data packet containing the scrambled video or audio. Descrambled video and/or audio may be output by descrambling engine 665 to storage medium 625 for storage (in DVR database 645) and/or to decoder module 633 for output to a television or other presentation equipment via television interface 635.

For simplicity, television receiver 600 of FIG. 6 has been reduced to a block diagram; commonly known parts, such as a power supply, have been omitted. Further, some routing between the various modules of television receiver 600 has been illustrated. Such illustrations are for exemplary purposes only. The state of two modules not being directly or indirectly connected does not indicate the modules cannot communicate. Rather, connections between modules of the television receiver 600 are intended only to indicate possible common data routing. It should be understood that the modules of television receiver 600 may be combined into a fewer number of modules or divided into a greater number of modules. Further, the components of television receiver 600 may be part of another device, such as built into a television.

It should be understood that television receiver 600, along with the other computerized systems and devices detailed herein, may include various computerized components including memories, processors, data buses, user interfaces, power supplies, etc. Such components have been omitted from the description and figures for simplicity.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A media content receiver device, comprising:
a processing unit comprising one or more processors; and
memory coupled with and readable by the processing unit and storing therein a set of computer-executable instructions which, when executed by the processing unit, causes the media content receiver device to:
receive mapping data from a media content provider system, the mapping data comprising a set of mappings between (a) one or more media content names, and (b) corresponding alternative name data for each of the media content names, the alternative name data comprising a listing of common error data for each of at least some of the media content names;
receive audio data corresponding to a user voice command;
perform a speech-to-text conversion process on the audio data of the user voice command, the speech-to-text conversion process generating a text command output;
identify, within the text command output, a text representation of requested media content;
compare the text representation of requested media content to a plurality of the alternative name data within the mapping data;
in response to determining that the text representation of requested media content matches a first alternative name data within the mapping data, select a first media content name corresponding to the first alternative name data; and
initiate a requested action on a media content having the first media content name.

2. The media content receiver device of claim 1, wherein the alternative name data of the received mapping data comprises phonetic encoding data for each of the media content names, and wherein said comparing comprises comparing the text representation of requested media content to the phonetic encoding data for each of the media content names.

3. The media content receiver device of claim 1, wherein the alternative name data of the received mapping data further comprises a listing of common name data for each of at least some of the media content names, and/or a listing of partial name data for each of at least some of the media content names.

4. The media content receiver device of claim 1, wherein selecting the first media content name corresponding to the first alternative name data comprises:
identifying a plurality of the alternative name data matching the text representation of requested media content;
identifying a plurality of media content names corresponding to the plurality of matching alternative name data; and
selecting the first media content name from the plurality of media content names, based on popularity data associated with the plurality of media content names.

5. The media content receiver device of claim 4, wherein the popularity data associated with the plurality of media content names corresponds to household popularity data based on content selections associated with the media content receiver device.

6. The media content receiver device of claim 1, wherein selecting the first media content name corresponding to the first alternative name data comprises:
identifying a plurality of the alternative name data matching the text representation of requested media content;
identifying a plurality of media content names corresponding to the plurality of matching alternative name data;
determining which of the plurality of media content names is available at the media content receiver device; and
selecting the first media content name from the plurality of media content names, based on a determination that the first media content name is available at the media content receiver device.

7. The media content receiver device of claim 1, wherein identifying the text representation of requested media content within the text command output comprises parsing the text command output to identify the text representation of requested media content, and a command action, and
wherein initiating the requested action comprises performing the command action on the media content having the first media content name.

8. A method of processing user voice commands received at content receiver devices, the method comprising:
receiving, by a content receiver device, mapping data from a media content provider system, the mapping data comprising a set of mappings between (a) one or more media content names, and (b) corresponding alternative name data for each of the media content names, the alternative name data comprising a listing of common error data for each of at least some of the media content names;
receiving, by the content receiver device, audio data corresponding to a user voice command;

performing, by the content receiver device, a speech-to-text conversion process on the audio data of the user voice command, the speech-to-text conversion process generating a text command output;

identifying, by the content receiver device, a text representation of requested media content within the text command output;

comparing, by the content receiver device, the text representation of requested media content to a plurality of the alternative name data within the mapping data;

in response to determining that the text representation of requested media content matches a first alternative name data within the mapping data, selecting, by the content receiver device, a first media content name corresponding to the first alternative name data; and initiating, by the content receiver device, a requested action on a media content having the first media content name.

9. The method of processing user voice commands of claim 8, wherein the alternative name data of the received mapping data comprises phonetic encoding data for each of the media content names, and wherein said comparing comprises comparing the text representation of requested media content to the phonetic encoding data for each of the media content names.

10. The method of processing user voice commands of claim 8, wherein the alternative name data of the received mapping data further comprises a listing of common name data for each of at least some of the media content names, and/or a listing of partial name data for each of at least some of the media content names.

11. The method of processing user voice commands of claim 8, wherein selecting the first media content name corresponding to the first alternative name data comprises:
identifying a plurality of the alternative name data matching the text representation of requested media content;
identifying a plurality of media content names corresponding to the plurality of matching alternative name data; and
selecting the first media content name from the plurality of media content names, based on popularity data associated with the plurality of media content names.

12. The method of processing user voice commands of claim 11, wherein the popularity data associated with the plurality of media content names corresponds to household popularity data based on content selections associated with the content receiver device.

13. The method of processing user voice commands of claim 8, wherein selecting the first media content name corresponding to the first alternative name data comprises:
identifying a plurality of the alternative name data matching the text representation of requested media content;
identifying a plurality of media content names corresponding to the plurality of matching alternative name data;
determining which of the plurality of media content names is available at the content receiver device; and
selecting the first media content name from the plurality of media content names, based on a determination that the first media content name is available at the content receiver device.

14. The method of processing user voice commands of claim 8, identifying the text representation of requested media content within the text command output comprises parsing the text command output to identify the text representation of requested media content, and a command action, and wherein initiating the requested action comprises performing the command action on the media content having the first media content name.

15. A non-transitory computer-readable memory comprising a set of instructions stored therein which, when executed by a processing unit of a content receiver device, causes the content receiver device to:
receive mapping data from a media content provider system, the mapping data comprising a set of mappings between (a) one or more media content names, and (b) corresponding alternative name data for each of the media content names, the alternative name data comprising a listing of common error data for each of at least some of the media content names;
receive audio data corresponding to a user voice command;
perform a speech-to-text conversion process on the audio data of the user voice command, the speech-to-text conversion process generating a text command output;
identify, within the text command output, a text representation of requested media content;
compare the text representation of requested media content to a plurality of the alternative name data within the mapping data;
in response to determining that the text representation of requested media content matches a first alternative name data within the mapping data, select a first media content name corresponding to the first alternative name data; and
initiate a requested action on a media content having the first media content name.

16. The non-transitory computer-readable memory of claim 15, wherein the alternative name data of the received mapping data comprises phonetic encoding data for each of the media content names, and wherein said comparing comprises comparing the text representation of requested media content to the phonetic encoding data for each of the media content names.

17. The non-transitory computer-readable memory of claim 15, wherein the alternative name data of the received mapping data further comprises a listing of common name data for each of at least some of the media content names, and/or a listing of partial name data for each of at least some of the media content names.

18. The non-transitory computer-readable memory of claim 15, wherein selecting the first media content name corresponding to the first alternative name data comprises:
identifying a plurality of the alternative name data matching the text representation of requested media content;
identifying a plurality of media content names corresponding to the plurality of matching alternative name data; and
selecting the first media content name from the plurality of media content names, based on popularity data associated with the plurality of media content names.

19. The non-transitory computer-readable memory of claim 18, wherein the popularity data associated with the plurality of media content names corresponds to household popularity data based on content selections associated with the content receiver device.

20. The non-transitory computer-readable memory of claim 15, wherein selecting the first media content name corresponding to the first alternative name data comprises:
identifying a plurality of the alternative name data matching the text representation of requested media content;

identifying a plurality of media content names corresponding to the plurality of matching alternative name data;
determining which of the plurality of media content names is available at the content receiver device; and
selecting the first media content name from the plurality of media content names, based on a determination that the first media content name is available at the content receiver device.

* * * * *